Feb. 16, 1926.
R. L. DIAMOND
1,573,044
AGRICULTURAL IMPLEMENT
Original Filed Sept. 6, 1924    2 Sheets-Sheet 2
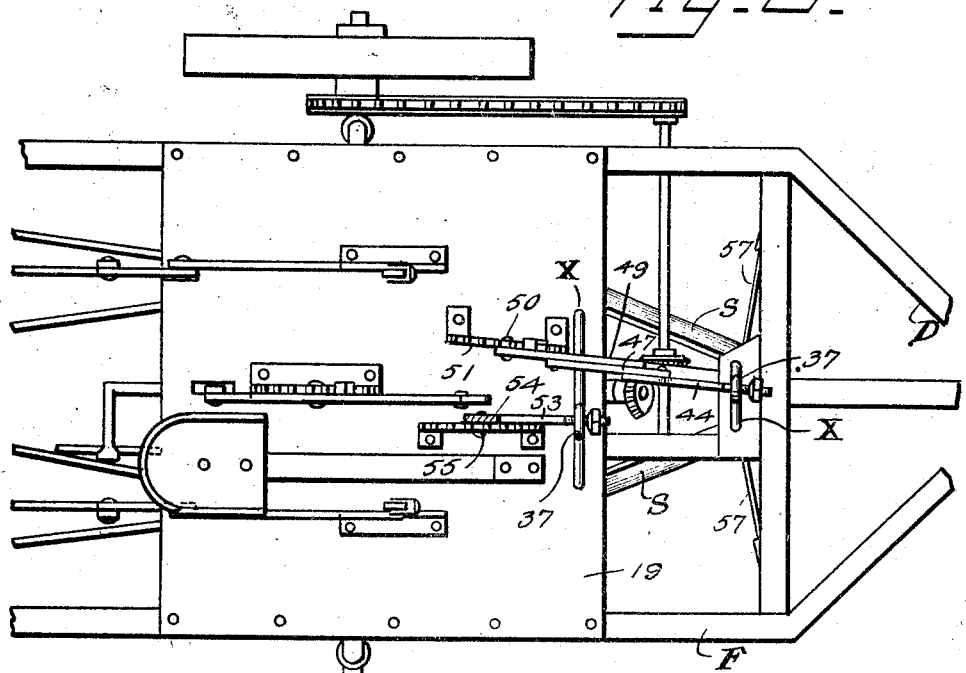
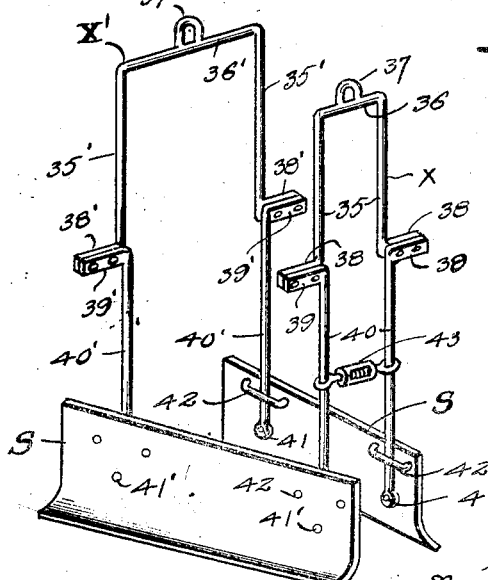

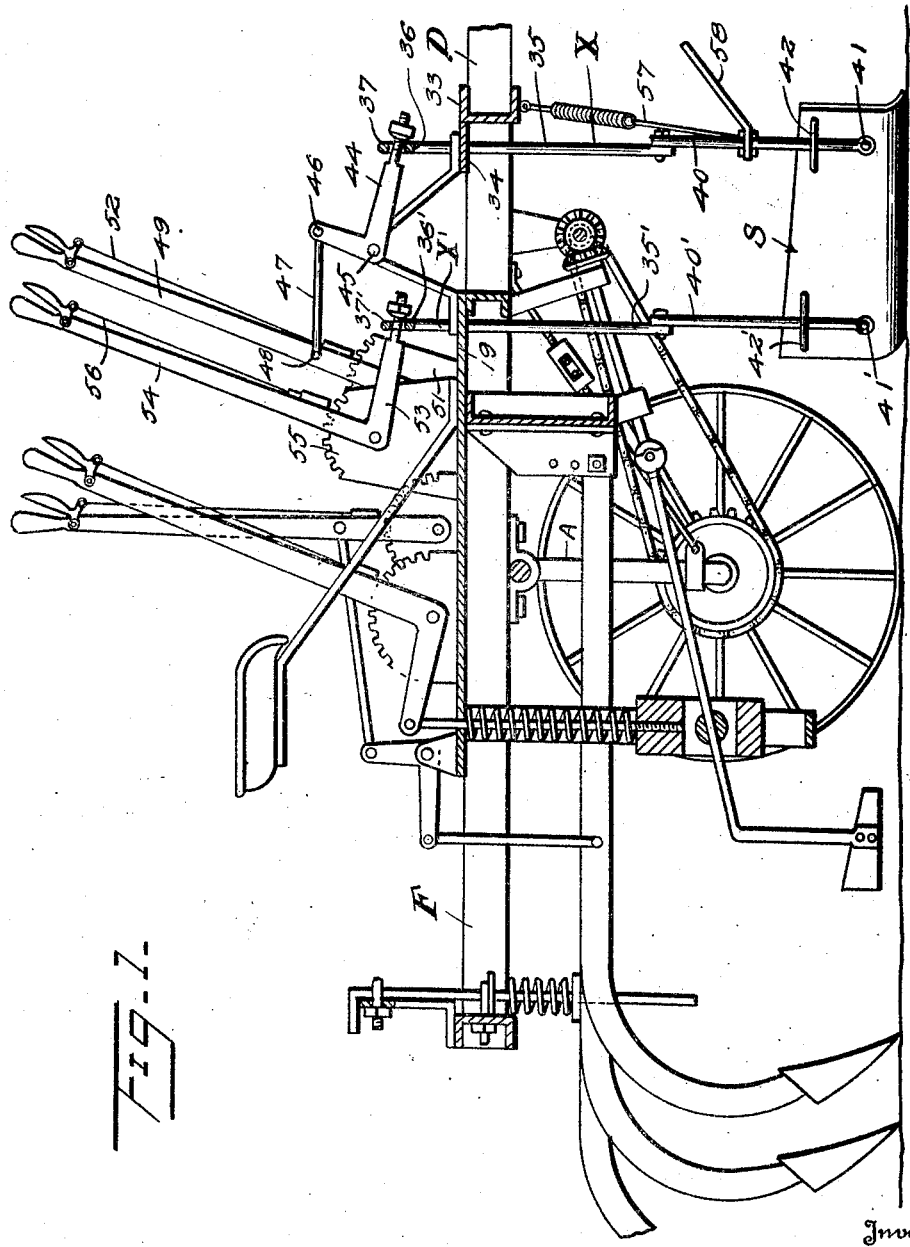

Patented Feb. 16, 1926.

1,573,044

UNITED STATES PATENT OFFICE.

RUBIN L. DIAMOND, OF McHENRY, MISSISSIPPI, ASSIGNOR OF ONE-HALF TO JOHN S. ADKISON, OF McHENRY, MISSISSIPPI.

AGRICULTURAL IMPLEMENT.

Original application filed September 6, 1924, Serial No. 736,341. Divided and this application filed May 14, 1925. Serial No. 30,332.

*To all whom it may concern:*

Be it known that I, RUBIN L. DIAMOND, a citizen of the United States, residing at McHenry, in the county of Stone and State of Mississippi, have invented certain new and useful Improvements in Agricultural Implements, of which the following is a specification, reference being had to the accompanying drawings, the same being a division of my pending application Serial No. 736,341, filed September 6, 1924.

This invention relates to certain improvements in agricultural implements and it is an object of the invention to provide a device of this general character comprising weed scrapers having means whereby the same may be adjusted to fully comply with the requirements of practice.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a vertical sectional view illustrating a weed scraper constructed in accordance with an embodiment of my invention and in applied position;

Figure 2 is a fragmentary view in top plan of the structure as illustrated in Figure 1;

Figure 3 is a view in perspective of the weed scrapers and the parts directly associated therewith unapplied.

As disclosed in the accompanying drawings, F denotes a frame mounted upon the arched axle A which is provided at its forward end portion with a suitable draft rigging D and 19 denotes a flooring supported by the frame F and overlying the central portion thereof.

The frame F includes a forward cross member 33 and arranged at the central portion of such cross member inwardly thereof and immediately adjacent thereto is a platform 34 through which is slidably disposed the side members 35 of a member X in the form of an inverted U, the intermediate member 36 of which being provided with an upstanding eye member 37. The lower and free extremities of the side members 35 are provided with the outstanding extensions 38 to which are secured the overlapping lateral extensions 39 carried by the elongated rods 40. The lower extremities of the rods 40 are pivotally engaged, as at 41, with the forward portions of the scraper blades S.

Freely disposed through the forward portion of the flooring 19 are the side members 35' of the member X' also in the form of an inverted U and having its intermediate portion 36' provided with an upstanding eye member 37'. The member X' is of a width greater than that of the member X. The lower and free extremities of the side members 35' are provided with the outstanding lateral extensions 38' to which are secured the overlapping lateral extensions 39' carried by the rods 40' having their lower end portions pivotally connected as at 41', with the rear portions of the blades S whereby said blades are maintained in desired relative position and in forward convergence. The rods 40 and 40' are also directed through the guide members 42 carried by the upper portion of each of the blades S and extending inwardly thereof. The rods 40 are connected by the interposed brace member 43 herein disclosed as expansible and retractible through the medium of a turnbuckle.

Operatively engaged within the eye member 37 of the member X is a forwardly directed arm of a bell crank lever 44 the heel portion of which being pivotally supported, as at 45, by the frame F. The upstanding arm of the lever 44 has operatively engaged therewith, as at 46, an end portion of a link 47, the opposite end portion being operatively connected, as at 48, with the upstanding lever 49. This lever 49 is pivotally engaged, as at 50, with the rack 51 carried by the flooring 19. The lever 49 is also provided with a conventional latch mechanism 52 coacting in a well-known manner with the rack 51 whereby the forward end portions of the blades S may be raised or lowered as desired.

The eye members 37' of the member X' has operatively engaged therewith a rock arm 53 carried by the lower or pivoted end portion of the upstanding lever 54 engaged with a rack 55. This rack 55 is carried by the flooring 19 and coacting with the rack 55 is the latch mechanism 56 of a general type carried by the lever 54. By proper manipulation of the lever 54 the rear portions of the blades S may be vertically adjusted as desired.

Each of the rods 40 has operatively engaged therewith a retractile brace member 57 also attached to the adjacent outer end portion of the member 33 of the frame F. The rods 40 also have operatively engaged therewith the retractile draft member 58 secured to the rigging D at a predetermined point in advance of the frame F.

From the foregoing description it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An agricultural implement comprising a portable body, a pair of member supported by the body for vertical movement, means for moving one of said members independently of the other, a pair of transversely spaced scrapers carried by the lower portions of said members, each of said members being substantially in the form of an inverted U, the side arms of which being pivotally secured to the scrapers, said members being spaced apart lengthwise of the implement and inwardly disposed guide members carried by the portions of the blades through which the side arms of the members are directed.

2. An agricultural implement comprising a portable body, a pair of members supported by the body for vertical movement, means for moving one of said members independently of the other, a pair of transversely spaced scrapers carried by the lower portions of said members, each of said members being substantially in the form of an inverted U, the side arms of which being pivotally secured to the scrapers, said members being spaced apart lengthwise of the implement, the rear member being of a greater width than the forward member and an adjustable brace member interposed between and secured to the side arms of the outer member.

In testimony whereof I hereunto affix my signature.

RUBIN L. DIAMOND.